Sept. 28, 1926.                J. L. WHEELER                  1,601,154
                              MEASURING ROLLER
                            Filed Sept. 29, 1921

Inventor:
John L. Wheeler.
By Elliott *[illegible]*
Attorneys

Patented Sept. 28, 1926.

1,601,154

UNITED STATES PATENT OFFICE.

JOHN L. WHEELER, OF ST. LOUIS, MISSOURI, ASSIGNOR TO THE MEASUREGRAPH COMPANY, OF ST. LOUIS, MISSOURI, A CORPORATION OF DELAWARE.

MEASURING ROLLER.

Application filed September 29, 1921. Serial No. 504,061.

This invention relates to fabric measuring and cost computing machines and particularly to the type of machine which embodies in its construction a measuring roller against which the fabric is pressed and which is rotated by the fabric as it is pulled through or past the machine. One of the difficulties which is encountered in the construction of such machines, is to insure accuracy in relatively long measurements.

The general object of this invention is to produce a measuring roller which will operate to insure accuracy in the measurements made by the machine.

Further objects of the invention will appear hereinafter.

The invention consists in the characteristic features of construction of the roller described in the following specification all of which contribute to produce an accurate and efficient measuring roller.

Figure 4:
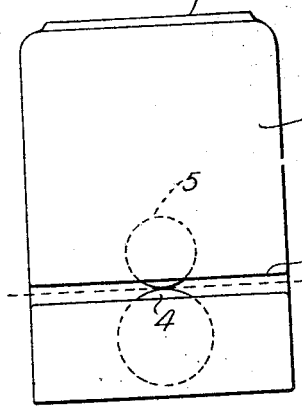
Figure 4 is a diagrammatic view illustrating a common type of machine in which the measuring roller may be employed.
Figure 3:
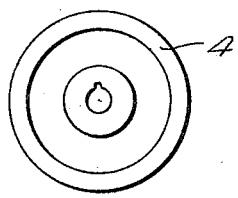
Figure 3 is an end elevation of the measuring roller.

A common type of machine in which my measuring roller may be employed is illustrated in Figure 4. It comprises a casing 1 having a gap or throat 2 through which the fabric to be measured is pulled on the line indicated by the dotted line 3. In passing through the gap 2 the fabric is held against the upper face of the measuring roller 4 by a presser roller 5. According to my invention I construct the measuring roller 4 of metal such as aluminum. The shaft that is driven by this roller, actuates the indicating mechanism which is displayed at the upper face 7 of the instrument. The shaft of the roller is not illustrated.

In order that the roller may be given a rotation by the fabric which will be an accurate index of the amount of fabric that moves past the roller during the measuring movement I provide the peripheral face of the measuring roller with a plurality of zones extending circumferentially about the same, and I provide these zones with surfaces or faces of different specific character. I prefer to provide three of these zones. They are indicated by the numerals 8, 9 and 10, the zone 8 being disposed in the middle portion of the roller and the zones 9 and 10 at each end. The different specific character of surface may be produced by knurling the zones according to a different pattern or a different degree of coarseness of pattern. In the present instance I simply make the knurling of the middle zone 8 coarser than the knurling of the two zones 9 and 10; and I make either of the zones 9 and 10, for example, the zone 9 coarser than the zone 10.

Figure 6:
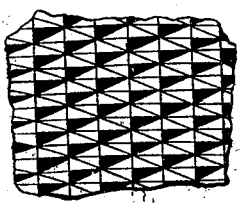
Figure 6 is a developed plan upon an enlarged scale showing a portion of the face of the roller.
Figure 5:
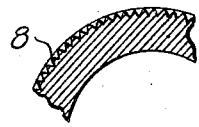
Figure 5 is a cross section in detail upon an enlarged scale and clearly illustrating details of the invention.
Figure 1:
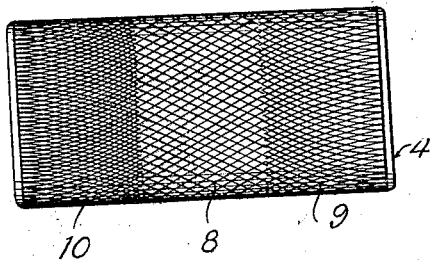
Figure 1 is a side elevation of the measuring roller embodying my invention.
Figure 2:
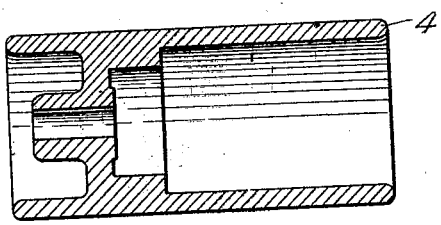
Figure 2 is a longitudinal section.

Figure 5 illustrates, upon a magnified scale, the character of this knurling. It is simply produced by impressing or cutting a plurality of parallel, V-shaped helical grooves or cuts on the face of the roller disposed in two sets extending across or transversely to each other. The grooves of the zones 9 and 10 are, of course, shallower than those of the zone 8.

With a roller having its surface provided with zones of different degrees of knurling, it is found that very accurate measurements may be effected. This increased accuracy in measurements effected by the use of my improved roller (having its surface knurled to various degrees of fineness, as above described), is due to the fact that there is a compensation provided for variations in the degree of gripping contact between the different zones of the roller. That is to say, a roller having the same character of knurling throughout may be rotated at slightly varying distances in the passage of the goods over the roller, due to the action of the parallel rolls of threads, as in linens and the like, or of the pile, as in velvets, plush and the like, upon the knurls or projections of the roller, which are usually formed by helical grooves. It will readily be seen that if one size of knurling would tend to be affected in this manner by the surface of the fabric drawn over it, this tendency would be offset by a different size of knurling, which would bear a different gripping relation to the surface of the fabric from that of the larger character of knurling. The intermediate size of knurling would simply afford a somewhat wider range of accommodation of the knurled surface to the fabric. The variation in measurements with a roller having uniform knurling is, of course, more pronounced in comparing the measurements of different characters of fabric, and my improved roller thus provides a relatively wide range of accommodation to prevent variation in the movement of the roller relative to the movement of the fabric thereover in measuring various characters of fabrics.

I claim:—

1. In a fabric measuring machine, a measuring roller mounted so as to be rotated by contact with the fabric to be measured, and having a plurality of contiguous zones extending circumferentially about the same, said zones having gripping surfaces of different degrees of coarseness.

2. In a fabric measuring machine, a measuring roller mounted so as to be rotated by contact with the fabric to be measured and having a plurality of contiguous knurled faces thereon, said knurled faces being different from each other, as respects the degree of knurling.

3. In a fabric measuring machine, a measuring roller mounted so as to be rotated by contact with the fabric to be measured and having knurled faces disposed in contiguous circumferential zones, the knurling of said faces being different in degree from each other.

4. In a fabric measuring machine, a measuring roller mounted so as to be rotated by contact with the fabric to be measured, the face of said roller being divided into a plurality of knurled faces disposed in contiguous circumferential zones on the roller; the knurling of said faces being different from each other, and each knurled face having a plurality of cuts extending in different directions on the face of the roller.

In testimony whereof, I have hereunto set my hand.

JOHN L. WHEELER.